UNITED STATES PATENT OFFICE.

MARK E. PUTNAM, OF MIDLAND, MICHIGAN, ASSIGNOR TO THE DOW CHEMICAL COMPANY, OF MIDLAND, MICHIGAN, A CORPORATION OF MICHIGAN.

METHOD OF MAKING CELLULOSE ESTERS.

1,396,878.     Specification of Letters Patent.     Patented Nov. 15, 1921.

No Drawing.    Application filed October 11, 1918. Serial No. 257,747.

*To all whom it may concern:*

Be it known that I, MARK E. PUTNAM, a citizen of the United States, and a resident of Midland, county of Midland, and State of Michigan, have invented a new and useful Improvement in Methods of Making Cellulose Esters, of which the following is a specification, the principle of the invention being herein explained and the best mode in which I have contemplated applying that principle so as to distinguish it from other inventions.

The preferred commercial method of producing soluble cellulose esters, of which cellulose acetate or acetyl cellulose may be taken as the principal and most important representative, consists in first forming a cellulose ester with the anhydrid of the proper monobasic fatty acid and thereupon hydrolyzing such ester to the desired degree. In conducting the esterification, referring specifically, for the purpose of illustration, to such cellulose acetate, the dry cellulose is treated with excess acetic anhydrid (at least two times the theoretical quantity seems requisite), preferably mixed with an equal or larger quantity of glacial acetic acid as a diluent and with a smaller quantity of sulfuric acid or other catalyst, at least that is the accepted view of the function which such last-named acid subserves in the resulting reaction. The product of such reaction is a substantially anhydrous acetyl cellulose, probably the tri-acetate, although this is a point on which a difference of opinion exists, and it is possible that the tetra-acetate is formed at least in part. In order to partially hydrolyze such cellulose acetate according to the prevailing practice, to the mixture resulting from the above described reaction, consisting of the cellulose derivative, with the excess of acetic anhydrid and the sulfuric acid, is slowly added a solution containing the calculated quantity of water for the hydrolysis and a certain quantity of glacial acetic acid which acts as a distributer or diluent for such water. The cellulose acetate is thereupon gradually hydrolyzed, but remains in solution until after an interval of some hours, when it is precipitated as a finely divided solid by adding it to a large quantity of water. The resulting partially hydrolyzed acetate is soluble in a variety of solvents, and in a number of other ways is much superior to product obtained where the cellulose is first hydrolyzed and then acetylated.

A serious difficulty, however, is encountered in working the process just described on a commercial scale in that upon adding the water-containing solution to the mixture resulting from the acetylation step, a violent reaction between the excess of acetic anhydrid and such water occurs, with the generation of considerable heat. As a result undesirable by-products are formed in addition to the partially hydrolyzed cellulose acetate, frequently in quantities sufficient to spoil the latter. Furthermore, even where the water solution is added gradually to the mixture from the acetylation step in an endeavor to keep down the temperature and minimize its harmful effects, the further difficulty is encountered, viz: that the acetylation continues until the anhydrid is completely neutralized, with the result that other undesired products are formed. Even where the acetylation is stopped short of the desired stage it is difficult to approximate the degree of further acetylation that will occur during the hydrolyzing stage and considerable uncertainty always attaches as to the character of the product.

The object of the present invention is to provide a method whereby the hydrolysis of the cellulose acetate may be effected in larger quantities or batches, the acetic anhydrid being reacted upon practically all at once when the acetylation reaches the desired stage and yet no harmful degree of temperature is produced. To the accomplishment of the foregoing and related ends, the invention then consists of the steps hereinafter fully described and particularly pointed out in the claims, the following description setting forth in detail one improved mode of carrying out the invention, such disclosed mode, however, constituting but one of the various ways in which the principle of the invention may be used.

In carrying out my improved process it is necessary as a basis for the operation of the process to first build up by the method hereinbefore described as the prevailing one, a body of the partially hydrolyzed material. In other words, the mixture of acetyl cellulose is hydrolyzed carefully to produce a practically pure product of the desired degree of hydrolysis. To a stated quantity of such hydrolyzed product is then added sufficient of the hydrolyzing solution, the same consisting as previously indicated, of water and acetic acid, (preferably in equal proportions), to hydrolyze a corresponding quantity of the anhydrous cellulose acetate mixture. I have found that where the hydrolyzing solution is thus inter-mixed with the previously formed hydrate, the addition of the second lot of anhydrous acetate can be accomplished all at once and directly, without any undue heating occurring or other untoward results.

As soon as such fresh lot of the anhydrous acetate mixture has been thoroughly mixed in, a predetermined portion, for example, one-half, of the resulting mixture is withdrawn, the proper quantity of hydrolyzing solution for reacting with another lot of the anhydrous acetate mixture added and such mixture thereupon added in mass and stirred up as before. The foregoing steps may obviously be repeated as long as desired.

It should be added that the hydrolysis is a relatively slow step, a number of hours being required for its completion, so that if the division of successive mixtures of previously hydrated material and hydrolyzing solution for treating the fresh batch of anhydrous cellulose acetate mixture be made immediately, there will be no over-hydrolysis but a standard and uniform product obtained. The aforesaid mixture of previously hydrolyzed acetate and hydrolyzing solution will in any event be cooled down to the proper degree to prevent any sudden rise of temperature due to the reaction of the acetic anhydrid in the anhydrous cellulose acetate mixture when the latter and such first named mixture are brought together. Owing to the distribution or dilution of the water in the mass of previously hydrolyzed acetate, the reaction with the acetic anhydrid is correspondingly disseminated throughout the mass and the temperature of the latter is at no point brought to a sufficiently high degree to detrimentally affect the product. The latter is not only uniform and better in every respect owing to the close control of the acetylation stage thus rendered possible, but the formation of objectionable by-products by reason of too high a temperature developing incidentally to the reaction between the water and acetic anhydrid, is practically eliminated.

Other modes of applying the principle of my invention may be employed instead of the one explained, change being made as regards the method herein disclosed, provided the step or steps stated by any one of the following claims or the equivalent of such step or steps be employed.

I therefore particularly point out and distinctly claim as my invention:—

1. The method of making cellulose derivatives which consists in acetylating cellulose with an excess of acetic anhydrid, and then hydrolyzing the resulting anhydrous cellulose acetate by adding the mixture from such first step to a mixture of previously hydrolyzed cellulose acetate and excess hydrolyzing solution.

2. The method of making cellulose derivatives which consists in acetylating cellulose with an excess of acetic anhydrid, and then hydrolyzing the resulting anhydrous cellulose acetate by adding the mixture from such first step to a mixture of previously hydrolyzed cellulose acetate and excess solution of acetic acid and water.

3. The method of making cellulose derivatives which consists in acetylating cellulose with an excess of acetic anhydrid; then hydrolyzing the resulting anhydrous cellulose acetate by adding the mixture from such first step to a mixture of previously hydrolyzed cellulose acetate and excess hydrolyzing solution; withdrawing a portion of the resulting mixture; admixing a further portion of hydrolyzing solution; and thereupon acetylating more cellulose to produce a proportionate quantity of anhydrous cellulose acetate with excess of acetic anhydrid and adding same to such last-named mixture.

4. The method of making cellulose derivatives which consists in acetylating cellulose with an excess of acetic anhydrid; then hydrolyzing the resulting anhydrous cellulose acetate by adding the mixture from such first step to a mixture of previously hydrated cellulose acetate and excess hydrolyzing solution; withdrawing a portion of the resulting mixture; admixing a further portion of hydrolyzing solution, and thereupon acetylating more cellulose to produce a proportionate quantity of anhydrous cellulose acetate with excess of acetic anhydrid and adding same to such last-named mixture, and again withdrawing a portion of the resulting mixture and proceeding as before.

5. In a method of making a hydrated cellulose acetate, the steps which consist in adding a hydrolyzing solution to a body of previously hydrolyzed cellulose acetate and then mixing with fresh body of anhydrous cellulose acetate containing excess of acetic anhydrid.

Signed by me, this 1st day of October 1918.

MARK E. PUTNAM.